United States Patent [19]

Rhodes et al.

[11] Patent Number: 4,849,481

[45] Date of Patent: Jul. 18, 1989

[54] STAR SHAPED ASYMMETRIC BLOCK COPOLYMER OF MONOALKENYL AROMATIC HYDROCARBON AND CONJUGATED DIENE

[75] Inventors: Robert B. Rhodes; Arthur R. Bean, both of Houston, Tex.

[73] Assignee: Shell Oil Company, Houston, Tex.

[21] Appl. No.: 71,845

[22] Filed: Jul. 10, 1987

[51] Int. Cl.⁴ .......................................... C08F 297/04
[52] U.S. Cl. ......................................... 525/314; 252/9; 252/43; 525/193; 525/250; 525/271; 524/534
[58] Field of Search ............... 525/250, 271, 314, 193; 524/534; 252/9, 43

[56] References Cited

U.S. PATENT DOCUMENTS

| | | | |
|---|---|---|---|
| 3,135,716 | 6/1964 | Uraneck et al. | 260/45.5 |
| 3,150,209 | 9/1964 | Short et al. | 260/894 |
| 3,231,635 | 1/1966 | Holden et al. | 260/880 |
| 3,265,765 | 8/1966 | Holden et al. | 260/876 |
| 3,322,856 | 5/1967 | Holden et al. | 260/876 |
| 3,496,154 | 2/1970 | Wofford | 260/84.7 |
| 3,498,960 | 3/1970 | Wofford | 260/84.7 |
| 3,554,911 | 1/1971 | Schiff et al. | 252/59 |
| 3,668,125 | 6/1972 | Anderson | 252/59 |
| 3,700,633 | 10/1972 | Wald et al. | 260/880 |
| 3,772,196 | 11/1973 | St. Clair et al. | 252/32.7 |
| 3,775,329 | 11/1973 | Eckert | 252/59 |
| 3,835,053 | 9/1974 | Meier et al. | 252/59 |
| 3,835,083 | 9/1974 | Tinkelenberg | 260/29.4 |
| 3,985,830 | 10/1976 | Fetters et al. | 260/880 |
| 4,077,893 | 3/1978 | Kiovsky | 252/56 |
| 4,116,917 | 9/1978 | Eckert | 260/33.6 |
| 4,141,847 | 2/1979 | Kiovsky | 252/51.5 |
| 4,145,298 | 3/1979 | Trepka | 252/51.5 |
| 4,156,673 | 5/1979 | Eckert | 260/33.6 |
| 4,238,202 | 12/1980 | Trepka et al. | 44/62 |
| 4,346,193 | 8/1982 | Werfel | 525/250 |
| 4,391,949 | 8/1987 | St. Clair | 525/99 |
| 4,427,834 | 1/1984 | Martin | 525/280 |
| 4,444,953 | 4/1984 | St. Clair | 525/88 |

FOREIGN PATENT DOCUMENTS 716645 8/1965 Canada .
1025295 4/1964 United Kingdom .

Primary Examiner—Wilbert J. Briggs, Sr.

[57] ABSTRACT

A star-shaped polymer useful as a polymeric VI improver comprising at least one arm which is a block copolymer containing a conjugated diolefin block and a monoalkenyl aromatic hydrocarbon block and a plurality of arms which are either a homopolymer of a conjugated diolefin or a copolymer of tow or more conjugated diolefin or a copolymer of two or more conjugated diolefins. Oil compositions comprising star-shaped VI improvers of this type exhibit relatively low HTHSR viscosities, and hence, improved fuel efficiencies when used in automotive applications. Oil compositions comprising star-shaped VI improvers of this type also exhibit improved low temperature pumpability.

15 Claims, 2 Drawing Sheets

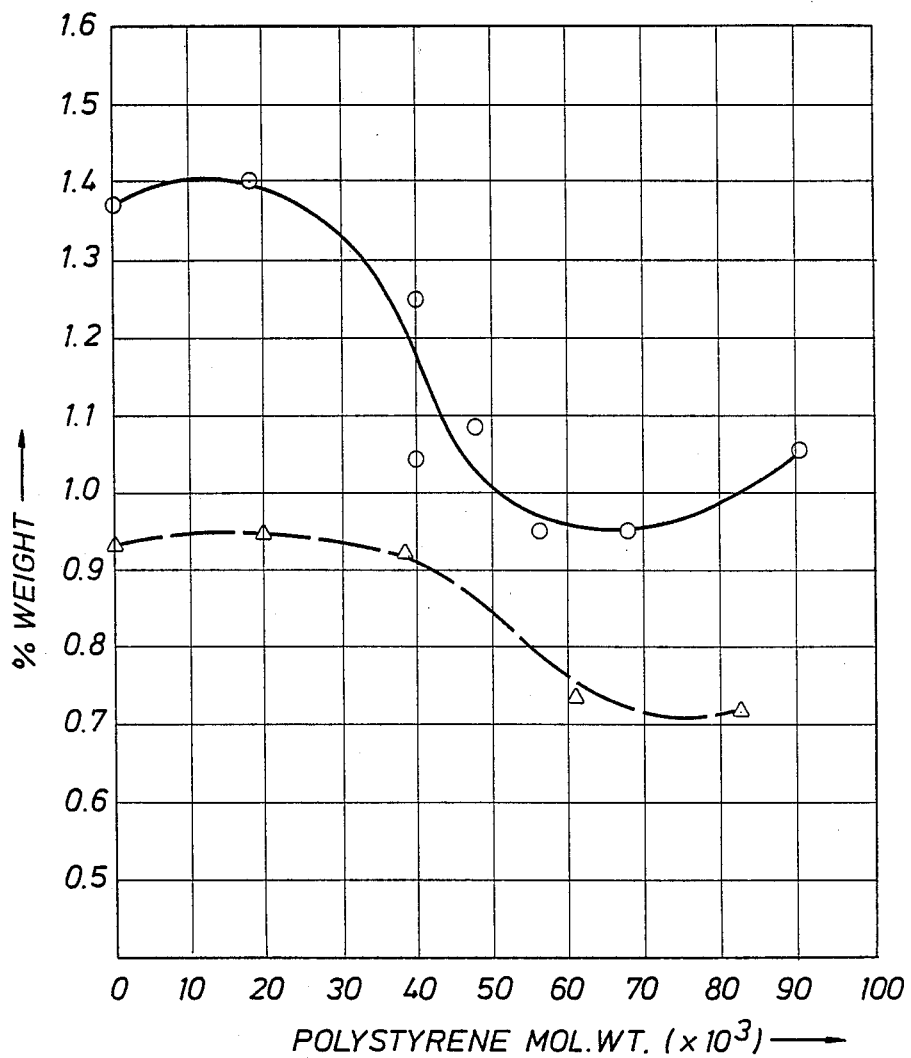

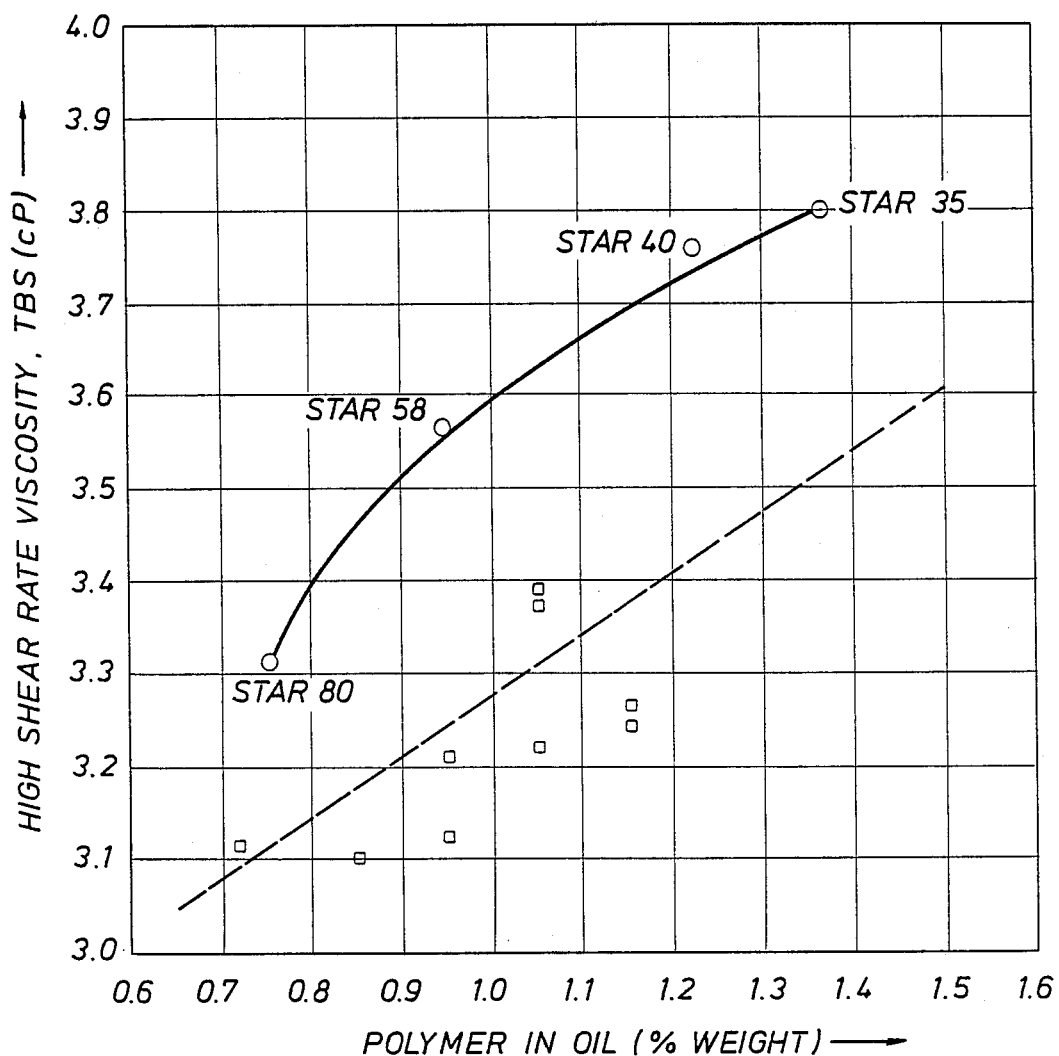

STAR SHAPED ASYMMETRIC BLOCK COPOLYMER OF MONOALKENYL AROMATIC HYDROCARBON AND CONJUGATED DIENE

BACKGROUND OF THE INVENTION

This invention relates to a polymeric additive which, when added to an oil will increase its viscosity, particularly at higher temperatures, and to an oil composition comprising said polymeric additive. More particularly, this invention relates to a polymeric additive of the star polymer variety and to lubricating oil compositions comprising the same.

As is well known, the viscosity of lubricating oils varies with temperature, and, since lubricating oils generally incur a relatively broad temperature range during use, it is important that the oil not be too viscous (thick) at low temperatures nor too fluid (thin) at higher temperatures. As is well known, variation in the viscosity-temperature relationship of an oil is indicated by the so-called viscosity index (VI). The higher the viscosity index, the less the change in viscosity with temperature. In general, the viscosity index is a function of the oils viscosity at a given lower temperature and a given higher temperature. The given lower temperature and the given higher temperature have varied over the years but are fixed at any given time in an ASTM test procedure (ASTM D2270). Currently, the lower temperature specified in the test is 40° C. and the higher temperature specified in the test is 100° C.

Heretofore several methods have been proposed for improving the rheological properties of lubricating oil compositions. Generally these methods involve the use of a polymeric additive. Early work involved the use of polymeric additives such as those taught in U.S. Pat. Nos. 3,554,911; 3,668,125; 3,772,196; 3,775,329 and 3,835,053. The polymeric additives taught in this series of U.S. patents are, generally, hydrogenated, substantially linear polymers of conjugated dienes which may, optionally, also contain monomeric units of a monoalkenyl aromatic hydrocarbon. Polymers of the type disclosed in this series of U.S. patents are typically prepared via the anionic solution polymerization of the monomers followed by hydrogenation. The process involves polymerizing a conjugated diene and optionally, a monoalkenyl aromatic hydrocarbon, in solution, in the presence of an anionic initiator to form an unsaturated, so-called living polymer. Examples of hydrogenated substantially linear polymers which are commercially used as VI improvers include hydrogenated styrene/butadiene and hydrogenated styrene/isoprene copolymers.

More recently, it has been discovered that certain so-called star-shaped polymers such as those disclosed in U.S. Pat. Nos. 4,077,893; 4,116,917; 4,141,847; 4,156,673 and 4,427,834, are effective VI improvers for lubricating oil compositions. In general, all or at least most of the arms contained in the so-called star-shaped polymers will be either homopolymers or copolymers of conjugated dienes or copolymers of one or more conjugated dienes and one or more monoalkenyl aromatic hydrocarbons. In certain such additives, however, one or more arms will either be modified or different. Polymeric additives wherein all of the arms are either a hydrogenated homopolymer or copolymer of one or more conjugated dienes or selectively hydrogenated copolymers of conjugated dienes and monoalkenyl arenes are disclosed in U.S. Pat. Nos. 4,116,917 and 4,156,673. Star-shaped polymers of the type disclosed in U.S. Pat. Nos. 4,116,917 and 4,156,673 which are modified to incorporate functional groups imparting dispersant characteristics are taught in U.S. Pat. Nos. 4,077,893 and 4,141,847. In the process disclosed in U.S. Pat. No. 4,077,893 hydrogenated star-shaped polymers are reacted first with an unsaturated carboxylic acid or derivative thereof and then with an alkane polyol. In the process disclosed in U.S. Pat. No. 4,141,847 hydrogenated star-shaped polymers are reacted first with an unsaturated carboxylic acid or derivative thereof and then with an amine. In the star-shaped polymeric additives taught in U.S. Pat. 4,427,834 star-shaped polymers such as those taught in U.S. Pat. Nos. 4,116,917 and 4,156,673 are, effectively, modified by incorporating an arm prepared by polymerizing a nitrogen containing polar compound monomer.

As is well known in the prior art, thickening efficieny of the polymeric additive is an important, and frequently the principal, consideration in its selection for use as a VI improver. Particularly, polymeric additives which significantly increase the high temperature kinematic viscosity without significantly increasing the low temperature kinematic viscosity are sought. In general, the thickening efficiency of any given polymeric additive will vary with polymer composition and structure but will, generally, increase with increased molecular weight. The ability of the polymeric additive to maintain an increase in viscosity after the same has been subjected to mechanical shear is also an important consideration in the selection of a polymeric additive for use as a VI improver. In general, lower molecular weight polymeric additives exhibit better mechanical shear stability than do the high molecular weight polymeric additives. Improved mechanical shear stability is, then, generally achieved at the expense of thickening efficiency. As a result, increased concentration of lower molecular weight polymeric additives will, generally, be required to achieve any given viscosity increase when lower molecular weight polymeric additives are used as a VI improver.

Another property which is frequently considered in the selection of a particular polymeric additive for use as a viscosity index improver is the high temperature, high shear rate (HTHSR) viscosity of the oil blend comprising the polymeric viscosity index improver. Heretofore, higher HTHSR viscosities were, generally, sought, although, as a practical matter, the HTHSR value associated with the desired balance of thickening efficiency and mechanical shear stability was generally accepted. In general, these HTHSR values have been relatively high. More recently, however, and as indicated in a paper entitled "The Effects of Engine Oil Viscosity and Composition on Fuel Efficiency", Clevinger, Carlson and Kleiser, which was presented at an SAE Fuels and Lubricants Meeting and Exposition in October, 1984, it has been learned that VI improvers having lower HTHSR viscosities lead to improved fuel efficiencies. In light of this recent discovery, the need for a viscosity index improver having a good balance between thickening efficiency and mechanical shear stability and also having a relatively low HTHSR viscosity thereby permitting the production of a multigrade oil having improved fuel efficiency is believed readily apparent.

SUMMARY OF THE INVENTION

It has now been discovered that the aforementioned deficiencies of the prior art VI improvers can at least be offset with the VI improver of the present invention and an improved lubricating oil composition prepared therewith. It is, therefore, an object of this invention to provide an improved polymeric VI improver. It is another object of this invention to provide an improved lubricating oil composition comprising said VI improver. It is still another object of this invention to provide a polymeric VI improver having a good balance between thickening efficiency and mechanical shear stability. It is still a further object of this invention to provide an improved multigrade lubricating oil composition having a relatively low HTHSR viscosity. The foregoing and still other objects and advantages of the present invention will become apparent from the description set forth hereinafter and the examples included herein.

In accordance with the present invention, the foregoing and other objects and advantages are accomplished with a star-shaped polymeric VI improver comprising a plurality of arms that are either a hydrogenated homopolymer of a conjugated diolefin or a copolymer of conjugated diolefins and at least one arm which is a selectively hydrogenated block copolymer of at least one conjugated diolefin and at least one monoalkenyl aromatic hydrocarbon and with a lubricating oil composition comprising such a polymeric VI improver. As indicated more fully hereinafter, the selectively hydrogenated block copolymer arm comprising at least one conjugated diolefin and at least one monoalkenyl aromatic hydrocarbon will be attached to the center of the star at the conjugated diolefin block. As also indicated more fully hereinafter, the molecular weight of the conjugated diolefin block of the block copolymer arms will be at least about 80% of the average molecular weight of the conjugated diolefin polymer arms but not more than about 120% of the average molecular weight of the conjugated diolefin polymer arms and the molecular weight of the monoalkenyl aromatic hydrocarbon block of the block copolymer arms will be about 0.65 times the molecular weight of the conjugated diolefin block but not more than about 7.5 times the molecular weight of the conjugated diolefin block of the block copolymer arms.

BRIEF DESCRIPTION OF THE DRAWINGS

FIG. 1 is a graph showing the weight percent of a block copolymer polymeric additive required to produce a 10W-40 oil for two series of block copolymers as a function of styrene block molecular weight in the polymer.

FIG. 2 is a graph showing the HTHSR viscosity of a multigrade oil composition as a function of polymer content in a 10W-40 oil for two series of star polymers, one of said series being within the scope of the present invention.

DETAILED DESCRIPTION OF THE INVENTION

As indicated supra, the present invention relates to an improved star-shaped polymeric VI improver and to a lubricating oil composition comprising such a VI improver. The star-shaped polymeric VI improver of this invention will comprise a plurality of arms consisting of a hydrogenated conjugated diolefin homopolymer or a hydrogenated copolymer of conjugated diolefins and at least one arm consisting of a selectively hydrogenated block copolymer comprising one block containing one or more conjugated diolefins and one block comprising one or more monoalkenyl aromatic hydrocarbons which block copolymer arm is attached to the nucleus of the star polymer through the conjugated diolefin block. The molecular weight of the conjugated diolefin block of the selectivel hydrogenated block copolymer arms will, generally, be within the range from about 0.8 times the average molecular weight of the remaining conjugated diolefin arms in the star polymer to about 1.2 times the average molecular weight of these conjugated diolefin arms. The molecular weight of the monoalkenyl aromatic hydrocarbon block of the selectively hydrogenated block copolymer arm will be from about 0.65 times the molecular weight of the conjugated diolefin block to about 7.5 times the molecular weight of the conjugated diolefin block. This, then, will insure that the block copolymer arm or arms is longer than the average length of the remaining conjugated diolefin arms. The star-shaped polymers of this invention which are useful as VI improvers may be prepared in a process comprising the following steps:

(a) preparing the conjugated diolefin arms by polymerizing one or more conjugated dienes in solution and in the presence of an anionic initiator to form a so-called living polymer comprising monomeric units of one or more dienes;

(b) preparing the block copolymer arms containing one block comprising monomeric units of one or more monoalkenyl aromatic hydrocarbon monomers and one block comprising monomeric units of one or more conjugated dienes by first polymerizing the monoalkenyl aromatic hydrocarbon monomer or monomers in solution and in the presence of an anionic initiator and then adding the conjugated diene monomer or monomers and completing the polymerization to produce a living block copolymer having alkali metal atoms on the conjugated diolefin blocks;

(c) combining the living polymers from steps (a) and (b) in the desired ratio and reacting the mixture with a polyalkenyl coupling agent to form a star-shaped polymer; and (d) hydrogenating the star-shaped polymer to form a hydrogenated star-shaped polymer.

The star-shaped polymers of this invention which are useful as VI improvers may also be prepared in a process comprising the following steps:

(a') first preparing the monoalkenyl aromatic block of the block copolymer by polymerizing one or more monoalkenyl aromatic monomers in solution and in the presence of an anionic initiator;

(b') completing preparation of the block copolymer arms and preparing the conjugated diolefin arms simultaneously by first adding additional anionic initiator to the solution of monoalkenyl aromatic hydrocarbon blocks prepared in step (a') and then adding one or more conjugated diolefins to the solution and continuing the polymerization until substantially complete;

(c') combining the solution of polymers from step (b') with a polyalkenyl coupling agent to form a star-shaped polymer; and (d') hydrogenation of the star-shaped polymer from step (c') to form a hydrogenated star-shaped polymer. As is well known in the art, the number of conjugated diolefin polymers produced in step (b') may be controlled by controlling the amount initiator added. As is also well known, the molecular weight of the conjugated diolefin blocks and the conjugated diolefin polymer arms can be controlled by controlling the amount of conjugated diolefin added. In the star-shaped polymer formed via the previous processes, the living polymers produced in steps (a) and (b) or (a') and (b') form the arms of the star-shaped polymer extending, generally, outwardly from the poly(polyalkenyl coupling agent) nucleus.

In general, any of the methods known in the prior art may be used to produce the living homopolymer of a conjugated diene or copolymer of conjugated dienes which is useful in the preparation of the star-shaped polymers of this invention. Suitable methods, then include, but are not limited to, those described in U.S. Pat. Nos. 3,135,716; 3,150,209; 3,496,154; 3,498,960; 4,145,298 and 4,238,202, the disclosure of which patents are herein incorporated by reference. In general, polymers of this type are prepared by combining one or more conjugated dienes in a suitable solvent and then polymerizing the conjugated diene or dienes in the presence of an organometallic compound particularly an organometallic compound containing an alkali metal atom. Particularly preferred organometallic compounds for use in the present invention are hydrocarbons containing a single lithium atom. Suitable hydrocarbon compounds containing a single lithium atom include unsaturated compounds such as allyllithium, methallylithum and the like; aromatic compounds such as phenyllithium and the like; the tolyllithiums, the xylyllithiums the napthyllithiums and the like; and alkyllithiums such as methyllithium, ethyllithium, propyllithium, butyllithium, amyllithium, hexyllithium, 2-ethylhexyllithium, n-hexadecyllithium and the like. Secondary-butyllithium is a most preferred initiator for use in the present invention.

Suitable conjugated dienes useful in the preparation of the living homopolymers and conjugated diene copolymers include 1,3-butadiene, isoprene, 1,3-pentadiene(piperylene), 2,3-dimethyl-1,3-butadiene, 3-butyl-1,3-octadiene, 1-phenyl-1,3-butadiene, 1,3-hexadiene, 4-ethyl-1,3-hexadiene and the like. 1,3-butadiene and isoprene are preferred conjugated dienes for use in preparation of the star-shaped polymer of this invention.

Suitable solvents useful in the preparation of the living conjugated diene homopolymers and the living conjugated diene copolymers include hydrocarbons such as paraffins, cycloparaffins, aromatics and alkyl-substituted aromatics containing from about 4 to about 10 carbon atoms per molecule. Suitable solvents particularly include benzene, toluene, cyclohexane, methylcyclohexane, n-butane, n-hexane, n-heptane, and the like.

Similarly, any of the processes known in the prior art to be useful in the preparation of a living block copolymer comprising one block containing conjugated diolefin monomer units and one block containing monoalkenyl aromatic hydrocarbon monomer units may be used to prepare the living block copolymer useful in the preparation of the star-shaped polymer of this invention. Such processes include those processes disclosed in U.S. Pat. Nos. 3,231,635; 3,265,765 and 3,322,856, the disclosure of which patents are herein incorporated by reference. It will, of course, be necessary to operate these processes in a manner such that a block copolymer comprising a single block containing monoalkenyl aromatic hydrocarbon monomer units and a single block containing conjugated diolefin monomer units is produced. In general, the living block copolymers useful in this invention will have the general formula (A-B)-M wherein A and B are as defined in the aforementioned U.S. Pat. Nos. 3,231,635; 3,265,765 and 3,322,856 and wherein M is a metal, particularly an alkali metal and preferably lithium. In general, block copolymers having the general formula (A-B)-M will be prepared by first combining one or more monoalkenyl aromatic hydrocarbon monomers in a suitable solvent and thereafter polymerizing the monoalkenyl aromatic hydrocarbon monomers in the presence of a suitable organometallic compound initiator and when the polymerization of the monoalkenyl aromatic hydrocarbon monomers is substantially complete then adding a sufficient amount of one or more conjugated diene monomers to the solution and continuing the polymerization until substantially all of the diene monomers have been polymerized. As is well known in the prior art, homopolymers and copolymers of conjugated diolefins may be prepared at the same time the conjugated diolefin block is prepared if additional anionic initiator is introduced after polymerization of the monoalkenyl aromatic hydrocarbon monomer is substantially complete and before the conjugated diolefin is introduced. As indicated supra, block copolymer, polymer mixtures formed in this manner may be used to prepare star-shaped polymers useful in this invention.

Suitable organo metallic compound initiators include all of those useful in the preparation of conjugated diene homopolymers and copolymers described above. Suitable monoalkenyl aromatic hydrocarbon monomers include aryl-substituted olefins such as styrene, various alkyl styrenes, paramethoxy styrene, vinyl naphthalene, vinyl toluene and the like. Suitable solvents for preparation of the living block copolymers useful in the preparation of the star-shaped polymers of this invention include all of the solvents indicated a useful in the preparation of the conjugated diene homopolymers and copolymers above. Suitable conjugated diolefins useful in the block copolymer include those diolefins identified above as useful in the diolefin homopolymer and copolymer arms.

In general, preparation of both of the living polymers useful in the preparation of the star-shaped polymer of this invention may be completed at a temperature within the range from about $-150°$ C. to about $300°$ C. In general, the polymerization in both cases will be carried out in an inert atmosphere, preferably nitrogen in a nitrogen atmosphere, and both polymerizations may be carried out under pressure, for example, at a pressure within the range from about 0.5 to about 10 bars. The concentration of initiator in both polymerization reactions may vary over a relatively wide range but will be controlled so as to produce living polymers having the desired molecular weights.

As indicated supra, the living diene homopolymers or copolymers and the living block copolymers comprising a single block containing one or more diene monomer units and a single block containing one or more monoalkenyl aromatic hydrocarbon monomer units may be prepared in separate steps and then combined prior to forming the star polymer. In general the two living polymers will be combined such that the blend contains one segment of block copolymer comprising one block containing conjugated diene monomer units and one block containing monoalkenyl aromatic hydrocarbon monomer units per from about 1 to about 10 segments of living conjugated diene homopolymer or copolymer. The star-shaped polymer ultimately produced would, then, on average, comprise arms consisting of a block copolymer having one block of monoalkenyl aromatic hydrocarbon monomer units and one block of conjugated diene monomer units and arms consisting of conjugated diene homopolymers or conjugated diene copolymers in the same ratio.

While separate preparation of the two living polymers used as arms in the star-shaped polymer of this invention offers the greatest flexibility in varying the molecular weight of the two living polymers and the molecular weight of the separate blocks in the block copolymer, as indicated supra, other methods may be used to prepare the desired blend of the two polymers useful in preparing the star-shaped polymer of this invention. For example, it is within the scope of the present invention to first prepare the monoalkenyl aromatic hydrocarbon monomer block as described above and then to add additional catalyst just prior to the time the conjugated diene monomer is added for the formation of the second block. This would, of course, result in the production of additional polymer chains comprising only conjugated diolefin monomer units. In this method, the ratio of living block copolymer comprising a single block containing monoalkenyl aromatic monomer units and a single block containing conjugated diolefin monomeric units to conjugated diene homopolymer or copolymer can be controlled by controlling the amount of catalyst added after the monoalkenyl aromatic hydrocarbon block is formed. It is also within the scope of this invention to first form a star-shaped polymer having conjugated diolefin arms and then growing block copolymer arms from the nucleus of the star such that the monoalkenyl aromatic hydrocarbon polymer block is grown after the conjugated diolefin polymer block. This particular method, however, affords little control over the ratio of block copolymer arms to conjugated diolefin polymer arms.

In general, the conjugated diolefin homopolymer and copolymer arms in the star-shaped polymers of this invention will have peak molecular weights, as determined by gel permetion chromatography (GPC), within the range from about 10,000 to about 100,000. The conjugated diolefin blocks of the block copolymer will have peak molecular weights, as determined by GPC, within the range from about 8,000 to about 120,000. The monoalkenyl aromatic hydrocarbon blocks will have peak molecular weights, as determined by GPC, within the range from about 10,000 to about 110,000. In this regard, and as indicated supra, the molecular weight of the monoalkenyl aromatic hydrocarbon block will range from about 0.65 to about 7.5 times the molecular weight of the conjugated dilefin block in the block copolymer. Higher values within this range are, then, applicable to lower molecular weight conjugated diolefin blocks while lower values within this range are applicable to higher molecular weight conjugateddiolefin blocks. This is illustrated in the curves shown in FIG. 1 where it is shown that: for a block copolymer comprising an isoprene block having a peak molecular weight within the range of about 35,000 to about 38,000 surprisingly good results occur starting at a styrene block peak molecular weight of about 45,000 [a polystyrene:polyisoprene molecular weight ratio of about 1.2] and continue until a styrene block peak molecular weight of at least 90,000 [a polystyrene:polyisoprene molecular weight ratio of about 2.5]; and for a block copolymer comprising an isoprene block having a peak molecular weight within the range of about 65,000 to about 68,000 surprisingly good results begin at a styrene block peak molecular weight of about 55,000 [a polystyrene:polyisoprene molecular weight ratio of about 0.8] and continue until a styrene block peak molecular weight of at least about 95,000 [a polystyrene:polyisoprene molecular weight ratio of about 1.5]. While not illustrated in FIG. 1, it has been estimated that surprisingly good results with an isoprene block having a peak molecular weight of about 25,000 will begin at a styrene block peak molecular weight of about 30,000 [a polystyrene:polyisoprene molecular weight ratio of about 1.2] and continue until a styrene block molecular weight of at least about 70,000 [a polystyrene:polyisoprene molecular weight ratio of about 2.8]. It has further been estimated that surprising good results will be realized with block copolymer arms having isoprene block peak molecular weights of about 8,000 at polystyrene block peak molecular weights ranging from about 20,000 to about 60,000 [polystyrene:polyisoprene molecular weight ratios from about 2.5 to about 7.5] and with block copolymers having isoprene block peak molecular weights of about 120,000 at styrene block molecular weights ranging from about 75,000 to about 110,000 [polystyrene:polyisoprene molecular weight ratios from about 0.625 to about 0.92]. All molecular weights recited herein will be molecular weights determined from the peak value of the GPC curve whether or not indicated.

In the next step of the preparation of the star-shaped polymer of this invention, a suitable blend of the two living polymers will be reacted with a polyalkenyl coupling agent. Polyalkenyl coupling agents capable of forming star-shaped polymers are, of course, well known in the prior art and several are disclosed in U.S. Pat. Nos. 3,985,830; 4,391,949; 4,444,953; Canadian Patent No. 716,645 and British Patent No. 1,025,295, the disclosure of which patents are herein incorporated by reference. In general, suitable polyalkenyl coupling agents contain at least two non-conjugated alkenyl groups. The non-conjugated alkenyl groups are usually attached to the same or a different electronwithdrawing group such as an aromatic nucleus. Suitable polyalkenyl coupling agents have the property that at least two of the alkenyl groups are capable of independent reaction with different living polymers and in this respect are different from conjugated dienes. In preparing the star-shaped polymers of this invention, pure or technical grade polyalkenyl coupling agents may be used. Suitable polyalkenyl coupling agents may be aliphatic, aromatic or heterocyclic. Examples of suitable aliphatic polyalkenyl coupling agents include the polyvinyl and polyallyl aceylenes, diacetylenes, phosphates, and phosphites and dimethacrylates such as ethylene dimethacrylate and the like. Examples of suitable heterocyclic polyalkenyl coupling agents include divinyl pyridine, divinyl thiophene, and the like. Suitable aromatic alkenyl coupling agents, which are preferred in the present invention, include polyvinyl benzene, polyvinyl toluene, polyvinyl xylene, polyvinyl anthracene, polyvinyl naphthalene, polyvinyl durene and the like. Suitable polyvinyl groups include divinyl, trivinyl and tetravinyl. As is well known, the polyalkenyl coupling agents may be used in admixture with small amounts of added monomers such as styrene or alkylated styrene which will increase the size of the nucleus. The star-shaped polymers of this invention may be prepared in accordance with any of the methods known in the prior art such as the methods taught in U.S. Pat. Nos. 4,116,917; 4,156,673; 4,391,949 and 4,444,953, the disclosure of which patents are herein incorporated by reference.

In general, the star-shaped polymers of this invention will be prepared by adding the polyalkenyl coupling agent to the living polymer solution after the polymerization of the monomer is substantially complete; i.e., the polyalkenyl coupling agent will be added only after substantially all of the monomer present during the preparation of the living polymer has been incorporated into the living polymer. The amount of polyalkenyl coupling agent added may vary between wide limits but generally at least 0.5 moles per mole of living polymer will be used. In general, from about 0.5 to about 15 moles of polyalkenyl coupling agent will be added per mole of living polymer, preferably from about 1.5 to about 5 moles of polyalkenyl coupling agent will be added per mole of living polymer. In general, the amount added will be sufficient to incorporate at least 80 to 85 wt % of the living polymer into the star-shaped polymer. As is well known, addition of the polyalkenyl coupling agent may be made in a plurality of stages.

In general, formation of the star-shaped polymer will be completed in the same solvent or solvents as was used to form the living polymers. In general, reaction of the living polymers with the polyalkenyl coupling agent will be accomplished at a temperature within the range from about 0° to about 150° C., preferably from about 20° to about 120° C. In general, the formation of the star-shaped polymer will be accomplished in an inert atmosphere, preferably nitrogen, at a pressure within the range from about 0.5 to 10 bars.

The star-shaped polymers of the present invention may be characterized as having a dense center or nucleus of crosslinked poly(polyalkenyl coupling agent) and a number of arms extending outwardly therefrom. The number of arms, as determined by gel permeation chromotography (GPC) may vary considerably but typically range from about 6 and about 13, preferably from about 7 to about 9. The star-shaped polymers of this invention may be represented by the general formula $(A-B_n-x-(C)_p$ wherein A-B is a block copolymer comprising a block A containing monoalkenyl aromatic hydrocarbon monomer units and a block B containing conjugated diene monomer units, C is a conjugated diene homopolymer or copolymer, n is a number having, on average, a value from about 0.5 to about 6.5 and p is a number having a value from about 3 to about 11.8 with the proviso that on average, the ratio of p:n will be within the range from about 1:1 to about 10:1 and x is the poly(polyalkenyl coupling agent) nucleus. Preferably, x is a poly(polyvinyl aromatic coupling agent) nucleus and most preferably, x is a poly(divinyl benzene) nucleus. As indicated above, the nucleus x is, generally, crosslinked.

The star-shaped polymers produced via the method described above will still contain metal atoms, particularly alkali metal atoms, preferably lithium atoms and additional arms may be incorporated into the star-shaped polymer by adding monomer to the star-shaped polymer after it is formed. The monomer may be the same or different from that used in the initial preparation of the arms. To the extent that the monomer or monomers added are different, the arms would be different. Moreover, the addition of monomer at this point could be controlled such that the additional arms thus produced would be block copolymers. Any additional polymerization would, of course, be completed at substantially the same conditions as were initially used in the preparation of the various living polymers ultimately incorporated as arms into the star polymer. As a practical matter, however, there would be no advantage to increasing the number of arms in the star polymer via this technique. To the extent that such further incorporation is not necessary or desirable, then, the metal sites may be deactivated by adding water or an alcohol, such as methanol, ethanol, isopropanol, 2-ethylhexanol and the like or a carboxylic acid such as formic acid, acetic acid or the like. Other compounds are, of course, known in the prior art to deactivate the active or living metal atom sites and any of these known compounds may also be used. Alternatively, the star polymer may simply be hydrogenated to deactivate the metal sites and since hydrogenation is an essential step in the preparation of the desired hydrogenated star-shaped polymers of this invention, hydrogenation is the preferred method to effect deactivation in the present invention.

In general, the star-shaped polymers prepared by combining the mixture of living polymers with a polyalkenyl coupling agent may be hydrogenated using any of the techniques known in the prior art to be suitable for such hydrogenation. In general, the hydrogenation conditions employed will be sufficient to insure that at least 50%, preferably at least 70%, more preferably at least 90% and most preferably at least 95% of the original olefinic unsaturation is hydrogenated. The hydrogenation conditions also will be selected so as to insure that less than about 20%, preferably less than 10% and most preferably less than 5% of the aromatic unsaturation is hydrogenated.

As indicated supra, any of the techniques known in the prior art to selectively hydrogenate the olefinic unsaturation may be used to hydrogenate the star-shaped polymer of this invention. In general, these techniques involve the use of a suitable catalyst particularly a catalyst or catalyst precursor comprising a Group VI or Group VIII metal atom. Suitable catalysts are described in U.K. Patent Specification No. 1,030,306, the disclosure of which patent specification is herein incorporated by reference. A particularly preferred method for selectively hydrogenating the star-shaped polymers of this invention is described in U.S. Pat. No. 3,700,633, the disclosure of which patent is herein incorporated by reference. In the process taught in U.S. Pat. No. 3,700,633 hydrogenation of the polymer is accomplished in the same solvent as was used during the polymerization with a catalyst comprising the reaction product of an aluminum alkyl and a nickel or cobalt carboxylate or alkoxide. In general, hydrogenation is accomplished at a temperature within the range from about 25° C. to about 175° C. at a hydrogen partial pressure below about 50 psig, and usually within the range from about 250 to about 1500 psig. In general, contacting times within the range from about 5 minutes to about 8 hours will be sufficient to permit the desired degree of hydrogenation. In general, the selectively hydrogenated star-shaped polymer may be recovered as a crumb using known techniques or used directly as a solution.

The selectively hydrogenated star-shaped polymers of this invention may be added to a variety of lubricating oils to produce improved lubricating oil compositions generally having improved viscosity index characteristics. For example, the selectively hydrogenated star-shaped polymers may be added to fuel oils such as middle distillate fuels, synthetic and natural lubricating oils, crude oils and industrial oils. In general, the concentration of the selectively hydrogenated star-shaped polymer in such oils may vary between wide limits with amounts within the range from about 0.05 to about 10 wt % being most common. Concentrations within the range from about 0.1 to about 5 wt % are preferred and concentrations within the range from about 0.5 to about 2.5 wt % are most preferred. Lubricating oil compositions prepared with the selectively hydrogenated star-shaped polymers of this invention may also contain other additives such as anti-corrosive additives, antioxidants, detergents, pour point depressants, one or more additional VI improvers and the like. Typical additives which are useful in the lubricating oil composition of this invention and their description will be found in U.S. Pat. Nos. 3,772,196 and 3,835,083, the disclosure of which patents are herein incorporated by reference.

PREFERRED EMBODIMENT OF THE INVENTION

In a preferred embodiment of the present invention, the starshaped polymers will comprise, on average, one block copolymer segment (arm) containing a single block having monoalkenyl aromatic hydrocarbon monomeric units and a single block having conjugated diene monomer units per each from about 6 to about 8 conjugated diene homopolymer or copolymer segments (arms) in the star-shaped polymer. Also, the starshaped polymer will, on average, contain from about 7 to about 9 arms, as determined by gel permeation chromatography (GPC) on a polystyrene scale. In the preferred embodiment, the conjugated diolefin block of the block copolymer will have a peak molecular weight within the range from about 18,000 to about 72,000; the monoalkenyl aromatic hydrocarbon block will have a peak molecular weight within the range from about 14,500 to about 86,500; and in a preferred embodiment, the conjugated diene homopolymer or copolymer arms will have a peak molecular weight within the range from about 20,000 to about 65,000; with the proviso that in the preferred embodiment, the molecular weight of the conjugated diolefin block will be from about 0.9 to about 1.1 times the molecular weight of the conjugated diolefin arms and the molecular weight of the monoalkenyl aromatic hydrocarbon block will be from about 0.7 to about 5 times the molecular weight of the conjugated diolefin block of the block copolymer arm. In a most preferred embodiment of this invention, the peak molecular weight of the conjugated diolefin block will range from about 35,000 to about 65,000 and the average molecular weight of the monoalkenyl aromatic hydrocarbon block will range from about 45,000 to about 95,000; with the proviso that in the most preferred embodiment, the molecular weight of the monoalkenyl aromatic hydrocarbon block will be from about 0.8 to about 2.5 times the molecular weight of the conjugated diolefin block of the block copolymer arm. In a most preferred embodiment of the present invention, a star-shaped polymer wherein the block copolymer arms comprise styrene in the monoalkenyl aromatic hydrocarbon block and isoprene in the conjugated diene block will be used. Also in a most preferred embodiment, the other arms in the star-shaped polymer will be homopolymers of isoprene. In an even more preferred embodiment of the present invention, the molecular weight of the isoprene block will be substantially the same as the molecular weight of the isoprene homopolymer blocks.

Having thus broadly described the present invention, a preferred and most preferred embodiment thereof, it is believed that the invention will become even more apparent by reference to the following examples. It will be appreciated, however, that the examples are presented solely for purposes of illustration and should not be construed as limiting the invention.

EXAMPLE 1

In this example, a hydrogenated star-shaped polymer comprising arms of a block copolymer containing a single block of styrene and a single block of hydrogenated isoprene and arms of hydrogenated polyisoprene was prepared. In the first step of the preparation, a blend of block copolymer and homopolymer arms were prepared by first polymerizing 1,775 grams of styrene in 16,000 grams of cyclohexene. The polymerization of styrene was initiated by adding 0.0296g mols of secondary butyllithium to the styrene solution. The polymerization of the styrene was continued for 30 minutes at 50° C. until the styrene monomer was substantially completely polymerized. The isoprene block and the desired amount of polyisoprene homopolymer was then formed by addding 0.207 g mols of s-butyllithium to the polystyrene solution and then adding 6401 grams of isoprene to the polystyrene solution. The polymerization of isoprene was continued for 65 minutes at 60° C. until substantially all of the isoprene was polymerized. The mixture of styrene/isoprene block copolymer and isoprene homopolymer thus produced comprised about one styrene/isoprene block copolymer segment per 7 segments of isoprene homopolymer. The GPC derived peak molecular weight of the styrene block was 57,000. The peak molecular weight of the isoprene block and the isoprene homopolymer was 27,000 based on a polyisoprene standard molecular weight. The resulting mixture of styrene/isoprene block copolymer and isoprene homopolymer was then cooled to about 60° C. and 169 g of a 55 wt % solution of divinyl benzene in ethylvinyl benzene was added to the mixture. The reaction was allowed to proceed for one hour after which the lithium sites remaining in the living star-shaped polymer were deactivated by adding methanol. It was determined that more than 94% of the living polymer solution had been incorporated into a star-shaped polymer. The star-shaped polymer was next hydrogenated so as to saturate about 98% of the ethylenic unsaturation originally contained in the star-shaped polymer in the presence of a catalyst prepared by combining Ni (octoate)$_2$ and Al (Et)$_3$ in cyclohexane. The molecular weight of the star-shaped polymer was then determined on a polystyrene scale using gel permeation chromotography (GPC). The molecular weight of the unhydrogenated star-shaped polymer on the polystyrene scale was 457,000. Based on the molecular weight thus determined and by determining a weight average for the polystyrene standard molecular weight of the arms, it was concluded that the star-shaped polymer contained, on average, 6.5 arms. The ratio of block copolymer arms to homopolymer arms is believed to be the same as the ratio of these components in the initial blend of block copolymer and homopolymer used to prepare the star-shaped polymer; viz. 1 to 7.

EXAMPLE 2

In this example, a hydrogenated star-shaped polymer containing arms of a styrene/isoprene block copolymer and arms of an isoprene homopolymer was prepared using the procedure summarized in Example 1 except that the amount of styrene/isoprene and secondary butyllithium was varied so as to produce a star-shaped polymer wherein the peak molecular weight of the styrene blocks was 52,000 and the peak molecular weight of the isoprene polymer blocks and the isoprene homopolymers was 29,000. The solution of styrene/isoprene block copolymer and isoprene homopolymer used to prepare the star-shaped polymer contained an average of one block copolymer segment per 7 segments of isoprene homopolymer. The molecular weight of the unhydrogenated star-shaped polymer on a styrene scale was 434,000. Based on this molecular weight and a calculated polystyrene standard molecular weight for the arms, the star-shaped polymer, on average contained 8.6 arms with an average of one block copolymer arm per 7 isoprene homopolymer arms.

EXAMPLE 3

In this example, a hydrogenated star-shaped polymer containing arms of a styrene/isoprene block copolymer and arms of an isoprene homopolymer was prepared using the procedure summarized in Example 1 except that the amount of styrene/isoprene and secondary butyllithium was varied so as to produce a star-shaped polymer wherein the peak molecular weight of the styrene blocks was 48,000 and the peak molecular weight of the isoprene polymer blocks and the isoprene homopolymers was 36,000. The solution of styrene/isoprene block copolymer and isoprene homopolymer used to prepare the star-shaped polymer contained an average of one block copolymer segment per 7 segments of isoprene homopolymer. The molecular weight of the unhydrogenated star-shaped polymer on a styrene scale was 467,000. Based on this molecular weight, the star-shaped polymer, on average contained 8.9 arms with an average of one block copolymer arm per 7 isoprene homopolymer arms.

EXAMPLE 4

In this example, a hydrogenated star-shaped polymer containing arms of a styrene/isoprene block copolymer and arms of an isoprene homopolymer was prepared using the procedure summarized in Example 1 except that the amount of styrene/isoprene and secondary butyllithium was varied so as to produce a star-shaped polymer wherein the peak molecular weight of the styrene blocks was 40,000 and the peak molecular weight of the isoprene polymer blocks and the isoprene homopolymers was 36,000. The solution of styrene/isoprene block copolymer and isoprene homopolymer used to prepare the star-shaped polymer contained an average of one block copolymer segment per 7 segments of isoprene homopolymer. The molecular weight of the unhydrogenated star-shaped polymer on a styrene scale was 442,000. Based on this molecular weight and as determined in Example 1, the star-shaped polymer, on average contained 7.5 arms with an average of one block copolymer arm per 7 isoprene homopolymer arms.

EXAMPLE 5

In this example, a hydrogenated star-shaped polymer containing arms of a styrene/isoprene block copolymer and arms of an isoprene homopolymer was prepared using the procedure summarized in Example 1 except that the amount of styrene/isoprene and secondary butyllithium was varied so as to produce a star-shaped polymer wherein the peak molecular weight of the styrene blocks was 68,000 and the peak molecular weight of the isoprene polymer blocks and the isoprene homopolymers was 36,000. The solution of styrene/isoprene block copolymer and isoprene homopolymer used to prepare the star-shaped polymer contained a average of one block copolymer segment per 7 segments of isoprene homopolymer. The molecular weight of the unhydrogenated star-shaped polymer on a polystyrene scale was 481,000. Based on this molecular weight and using a calculated polystyrene standard molecular weight for the arms, the star-shaped polymer, on average contained 7.7 arms with an average of one block copolymer arm per 7 isoprene homopolymer arms.

EXAMPLE 6

In this example, a hydrogenated star-shaped polymer containing arms of a styrene/isoprene block copolymer and arms of an isoprene homopolymer was prepared using the procedure summarized in Example 1 except that the amount of styrene/isoprene and secondary butyllithium was varied so as to produce a star-shaped polymer wherein the peak molecular weight of the styrene blocks was 57,000 and the peak molecular weight of the isoprene polymer blocks and the isoprene homopolymers was 38,000. The solution of styrene/isoprene block copolymer and isoprene homopolymer used to prepare the star-shaped polymer contained an average of one block copolymer segment per 7 segments of isoprene homopolymer. The molecular weight of the unhydrogenated star-shaped polymer on a styrene scale was 488,000. Based on this molecular weight, it was determined that the star-shaped polymer, on average contained 7.6 arms with an average of one block copolymer arm per 7 isoprene homopolymer arms.

EXAMPLE 7

In this example, a hydrogenated star-shaped polymer containing arms of a styrene/isoprene block copolymer and arms of an isoprene homopolymer was prepared using the procedure summarized in Example 1 except that the amount of styrene/isoprene and secondary butyllithium was varied so as to produce a star-shaped polymer wherein the peak molecular weight of the styrene blocks was 91,000 and the peak molecular weight of the isoprene polymer blocks and the isoprene homopolymers was 38,000. The solution of styrene/isoprene block copolymer and isoprene homopolymer used to prepare the star-shaped polymer contained an average of one block copolymer segment per 5 segments of isoprene homopolymer. The molecular weight of the unhydrogenated star-shaped polymer on a styrene scale was 525,000. Based on this molecular weight, it was determined that the star-shaped polymer on average contained 7.7 arms with an average of one block copolymer arm per 5 isoprene homopolymer arms.

EXAMPLE 8

In this example, a hydrogenated star-shaped polymer containing arms of a styrene/isoprene block copolymer and arms of an isoprene homopolymer was prepared using the procedure summarized in Example 1 except that the amount of styrene/isoprene and secondary butyllithium was varied so as to produce a star-shaped polymer wherein the peak molecular weight of the styrene blocks was 68,000 and the peak molecular weight of the isoprene polymer blocks and the isoprene homopolymers was 42,000. The solution of styrene/isoprene block copolymer and isoprene homopolymer used to prepare the star-shaped polymer contained an average of one block copolymer segment per 7 segments of isoprene homopolymer. The molecular weight of the hydrogenated star-shaped polymer on a styrene scale was 543,000. Based on this molecular weight, it was determined that the star-shaped polymer, on average contained 7.6 arms with an average of one block copolymer arm per 7 isoprene homopolymer arms.

EXAMPLE 9

In this example, a hydrogenated star-shaped polymer containing arms of a styrene/isoprene block copolymer and arms of an isoprene homopolymer was prepared using the procedure summarized in Example 1 except that the amount of styrene/isoprene and secondary butyllithium was varied so as to produce a star-shaped polymer wherein the peak molecular weight of the styrene polymer blocks was 61,000 and the peak molecular weight of the isoprene polymer blocks and the isoprene homopolymers was 62,000. The solution of styrene/isoprene block copolymer and isoprene homopolymer used to prepare the star-shaped polymer contained an average of one block copolymer segment per 6 segments of isoprene homopolymer. The molecular weight of the unhydrogenated star-shaped polymer on a styrene scale was 892,000. Based on this molecular weight, it was determined that the star-shaped polymer, on average contained 8.4 arms with an average of one block copolymer arm per 6 isoprene homopolymer arms.

EXAMPLE 10

In this example, a hydrogenated star-shaped polymer comprising only isoprene homopolymer arms was prepared using the procedure of Example 1 except that the first step relating to the polymerization of styrene was omitted. In this Example, the amount of s-butyllithium and isoprene used was adjusted so as to produce isoprene homopolymers having a peak molecular weight of 35,000. The molecular weight of the unhydrogenated star-shaped polymer thus produced was 447,000 on a polystyrene scale. Based on this molecular weight, it was determined that the star-shaped polymer, on average, contained 7.6 arms.

EXAMPLE 11

In this example, a star-shaped polymer comprising only isoprene homopolymer arms was prepared using the procedure summarized in Example 10 except that the amount of s-butyllithium and isoprene used was adjusted so as to produce an isoprene homopolymer having a peak molecular weight of 58,000. The molecular weight of the star-shaped polymer thus produced was 609,000 on a polystyrene scale. Based on this molecular weight, it was determined that the star-shaped polymer, on average, contained 7.2 arms.

EXAMPLE 12-22

In these examples the hydrogenated star-shaped polymers produced in Examples 1-11 were used as VI improvers in a 10W-40 multigrade lubricating oil composition. The base stock used in the preparation of the multigrade lubricating oil composition was a blend of an HVI 100N oil and an HVI 250N oil. The amount of HVI 250N oil was varied so as to provide a lubricating oil composition having a viscosity within the range from about 32 to about 35 poise as measured in the cold cranking simulator (see SAE J-300, Apr. 84) at −20° C. Interestingly, since the selectively hydrogenated star-shaped polymers of this invention contributed very little, if any, to the low temperature viscosity component, more heavier, less volatile base stock could be used than could heretofore be used with star-shaped polymeric VI improvers known in the prior art such as those produced in Examples 10 and 11. The multigrade lubricating oil compositions prepared in these examples also contained 7.75 wt % of a commercially available additive package (Lubrizol 7573) and 0.3 wt % Acryloid 160. The kinematic viscosity at 100° C., the viscosity index, the coal cranking simulator (CCS) viscosity at −20° C., the engine oil pumpability at −25° C. using the mini-rotary viscometer (MRV), (ASTM D4684) and the high temperature high shear rate (HTHSR) viscosity at 150° C. at $1 \times 10^6 seconds^{-1}$ using the tapered bearing simulator (TBS) (ASTM D4683) were determined for each lubricating oil composition. The star-shaped polymer, the amount thereof added to the oil composition, the percent of HVI 25ON oil used in the lubricating oil composition and all other results are summarized in a table below:

| Example No. | Polymer of | MW × 10$^{-3}$ | % wt | % HVI 250 N | Kinematic Vis., 100° C. cSt | VI | CCS −20° C. cP | MRV −25° C. cP | TBS 150° C. cP |
|---|---|---|---|---|---|---|---|---|---|
| 12 | Example 1 | 457 | 1.15 | 25 | 13.47 | 150 | 3279 | 17,112 | 3.27 |
| 13 | Example 2 | 434 | 1.15 | 30 | 13.90 | 158 | 3098 | 16,534 | 3.25 |
| 14 | Example 3 | 467 | 1.05 | 29 | 13.47 | 137 | 3219 | 19,280 | 3.39 |
| 15 | Example 4 | 442 | 1.05 | 30 | 14.13 | 137 | 3045 | 19,009 | 3.38 |
| 16 | Example 5 | 481 | 0.95 | 28 | 13.87 | 160 | 3369 | 17,700 | 3.13 |
| 17 | Example 6 | 488 | 0.95 | 26 | 13.89 | 159 | 3243 | 16,830 | 3.21 |
| 18 | Example 7 | 525 | 1.05 | 22.5 | 13.97 | 164 | 3292 | 16,801 | 3.23 |
| 19 | Example 8 | 543 | 0.85 | 30.0 | 13.2 | 158 | 3137 | 16,843 | 3.10 |
| 20 | Example 9 | 892 | 0.72 | 29.1 | 13.74 | 157 | 3330 | 18,543 | 3.11 |
| 21 | Example 10 | 447 | 1.37 | 29.9 | 14.13 | 160 | 3284 | 20,904 | 3.77 |
| 22 | Example 11 | 609 | 0.93 | 29.1 | 14.17 | 156 | 3331 | 21,422 | 3.54 |

From the data summarized in the foregoing Table, it is apparent that when molecular weight is taken into consideration, the VI improvers of this invention (Examples 12-20) exhibit improved thickening efficiency when compared to the prior art star-shaped polymeric VI improvers (Examples 21-22). The VI improvers of this invention also exhibit improved low temperature pumpability when compared to the same prior art VI improvers.

EXAMPLE 25

In this example, a series of hydrogenated star-shaped polymers having on average 1 block copolymer arm per 7 homopolymer arms were prepared using the method summarized in Example 1 (modified as required) wherein the molecular weight of the styrene block was varied while the molecular weight of the isoprene block and the isoprene homopolymer was, to the extent reasonably practicable, maintained constant. The weight percent of polymer required to produce a 10W-40 oil was then determined for each polymer. The results obtained with each polymer and the molecular weight of the polystyrene block therein is shown in the upper curve (open circles) of FIG. 1. For convenience, the amount of the polymer prepared in Example 10 required to produce a 10W-40 oil is also shown on the curve at a styrene molecular weight of 0. While an effort was made in this Example to maintain a constant isoprene molecular weight of 36,500, the isoprene molecular weight, as determined, varied within the range from 35,000 to 38,000. As will be apparent from FIG. 1, the amount of polymer required to produce a 10W-40 oil initially increased (low molecular weight polystyrene blocks) but then rapidly decreased until a minimum value was realized with block copolymers containing polystyrene blocks having a molecular weight of about 68,000. The amount required thereafter increased with increased polystyrene block molecular weight. The minimum value, then, occurred at a polystyrene block-/isoprene block molecular weight ratio of about 1.9.

EXAMPLE 26

In this example, a series of hydrogenated star-shaped polymers having on average 1 block copolymer arm per 7 homopolymer arms were prepared using the method summarized in Example 1 (modified as required) wherein the molecular weight of the styrene block was varied while the molecular weight of the isoprene block and the isoprene homopolymer was, to the extent reasonably practicable, maintained constant. The weight percent of polymer required to produce a 10W-40 oil was then determined for each polymer. The results obtained with each polymer and the molecular weight of the polystyrene block therein is shown in the lower curve (open triangles) of FIG. 1. For convenience, the amount of the polymer prepared in Example 11 required to produce a 10W-40 oil is also shown on the curve at a styrene molecular weight of 0. While an effort was made in this Example to maintain a constant isoprene molecular weight of 63,500 the isoprene molecular weight, as determined, varied within the range from 62,000 to 65,000. As will be apparent from FIG. 1, the amount of polymer required to produce a 10W-40 oil initially increased (low molecular weight polystyrene blocks) but then rapidly decreased until a minimum value was realized with block copolymers containing polystyrene blocks having a peak molecular weight of about 75,000. The minimum value, then, occurred at a polystyrene block/isoprene block molecular weight ratio of about 1.2.

As will be apparent from the data summarized in both curves of FIG. 1 the minimum amount of polymeric additive required to produce a 10W-40 oil (thickening efficiency) varies firstly with the molecular weight of the conjugated diolefin block of the block copolymer arm and, secondly, with the molecular weight of the monoalkenyl aromatic hydrocarbon block. As will also be apparent, the ratio of the monoalkenyl aromatic hydrocarbon block molecular weight to the conjugated diolefin block molecular weight, at the point where the thickening efficiency is at a maximum, decreases with increasing conjugated diolefin block molecular weight and increases with decreasing conjugated diolefin block molecular weight.

EXAMPLE 27

In this Example, two star-shaped polymers comprising only isoprene homopolymer arms were prepared using the procedure summarized in Examples 10 and 11 except that the amount of s-butyllithium and isoprene was adjusted to produce a first star-shaped polymer having arms with a peak molecular weight of about 40,000 and a second star-shaped polymer having arms with peak molecular weight of about 80,000. These polymers were then used to prepare a 10W-40 oil and the HTHSR viscosity of both oils determined at 150° C. using the procedure summarized in Examples 12-22. The HTHSR viscosity values actually obtained are plotted in FIG. 2 (upper curve) as a function of polymer concentration in the 10W-40 oil composition. The upper curve in FIG. 2 also includes the HTHSR viscosity values obtained in Examples 21 and 22. For convenience, the value obtained in Example 21 is identified as Star 35, the value obtained with the star-shaped polymer of this Example containing arms with a molecular weight of about 40,000 is identified as Star 40, the value obtained in Example 22 is identified as Star 58 and the value obtained with the polymer of this Example containing arms with a molecular weight of about 80,000 is identified as Star 80. For comparison purposes, the HTHSR viscosity values obtained in Examples 12-20 with polymers within the scope of this invention are also plotted in FIG. 2 (lower curve). As is apparent from FIG. 2, the HTHSR viscosity values obtained with polymers within the scope of this invention are generally lower than those obtained with the more conventional star-shaped polymers. For the reasons indicated in the paper entitled "The Fuel Effects of Engine Oil Viscosity and Composition on Fuel Efficiency" by Clevinger, Carlson and Kleiser, the oil compositions prepared with the star-shaped polymers of this invention should exhibit improve fuel efficiencies.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

Having thus described and illustrated the present invention, what is claimed is:

1. A selectively hydrogenated star-shaped polymer comprising at least one arm of a block copolymer containing a single monoalkenyl aromatic hydrocarbon block and a single block having conjugated diene monomer units and a plurality of arms of a conjugated diene homopolymer or copolymer and a poly(polyalkenyl coupling agent) nucleus, said polymer containing from about 6 to about 13 total arms as determined by (GPC) on a styrene scale and one block copolymer arm, on average, for from about 6 to about 8 conjugated diolefin homopolymer or copolymer arms, the molecular weight of the monoalkenyl aromatic hydrocarbon block being from about 0.65 to about 7.5 times the molecular weight of the conjugated diene block in said block copolymer and the molecular weight of the conjugated diene block of the block copolymer being from about 0.8 to about 1.2 times the molecular weight of the conjugated diene homopolymer or copolymer blocks.

2. The selectively hydrogenated star-shaped polymer of claim 1 wherein the weight average molecular weight of the conjugated diolefin block is from about 0.9 to about 1.1 times the molecular weight of the conjugated diene block in said block copolymer.

3. The selectively hydrogenated star-shaped of claim 2 wherein the molecular weight of the conjugated diene block in said block copolymer is substantially equal to the average weight average molecular weight of the conjugated diene homopolymer or copolymer arms.

4. The selectively hydrogenated star-shaped polymer of claim 1 wherein said monoalkenyl aromatic hydrocarbon is styrene.

5. The selectively hydrogenated star-shaped polymer of claim 4 wherein said conjugated diene is isoprene.

6. A selectively hydrogenated star-shaped polymer comprising at least one arm of a block copolymer containing a single monoalkenyl aromatic hydrocarbon block and a single block having conjugated diene monomer units and a plurality of arms of a conjugated diene homopolymer or copolymer and a poly(polyalkenyl coupling agent) nucleus, said polymer containing from about 6 to about 13 total arms as determined by (GPC) on a styrene scale and one block copolymer arm, on average, for from about 6 to about 8 conjugated diolefin homopolymer or copolymer arms, the molecular weight of the monoalkenyl aromatic hydrocarbon block being from about 0.7 to about 5.0 times the molecular weight of the conjugated diene block in said block copolymer and the molecular weight of the conjugated diene block of the block copolymer being from about 0.8 to about 1.2 times the weight average molecular weight of the conjugated diene homopolymer or copolymer blocks.

7. The selectively hydrogenated star-shaped polymer of claim 6 wherein the molecular weight of the conjugated diolefin block is from about 0.9 to about 1.1 times the molecular weight of the conjugated diene block in said block copolymer.

8. The selectively hydrogenated star-shaped polymer of claim 7 wherein the molecular weight of the conjugated diene block in said block copolymer is substantially equal to the molecular weight of the conjugated diene homopolymer or copolymer arms.

9. The selectively hydrogenated star-shaped polymer of claim 6 wherein said monoalkenyl aromatic hydrocarbon is styrene.

10. The selectively hydrogenated star-shaped polymer of claim 9 wherein said conjugated diene is isoprene.

11. The selectively hydrogenated star-shaped polymer comprising at least one arm of a block copolymer containing a single monoalkenyl aromatic hydrocarbon block and a single block having conjugated diene monomer units and a plurality of arms of a conjugated diene homopolymer or copolymer and a poly(polyalkenyl coupling agent) nucleus, said polymer containing from about 7 to about 9 total arms as determined by (GPC) on a styrene scale and one block copolymer arm, on average, for from about 6 to about 8 conjugated diolefin homopolymer or copolymer arms, the molecular weight of the monoalkenyl aromatic hydrocarbon block being from about 0.8 to about 2.5 times the molecular weight of the conjugated diene block in said block copolymer and the molecular weight of the conjugated diene block of the block copolymer being from about 0.8 to about 1.2 times the molecular weight of the conjugated diene homopolymer or copolymer blocks.

12. The selectively hydrogenated star-shaped polymer of claim 11 wherein the molecular weight of the conjugated diolefin block is from about 0.9 to about 1.1 times the molecular weight of the conjugated diene block in said block copolymer.

13. The selectively hydrogenated star-shaped polymer of claim 12 wherein the molecular weight of the conjugated diene block in said block copolymer is substantially equal to the molecular weight of the conjugated diene homopolymer or copolymer arms.

14. The selectively hydrogenated star-shaped polymer of claim 11 wherein said monoalkenyl aromatic hydrocarbon is styrene.

15. The selectively hydrogenated star-shaped polymer of claim 14 wherein said conjugated diene is isoprene.

* * * * *